US010390000B2

(12) United States Patent
Card, II

(10) Patent No.: US 10,390,000 B2
(45) Date of Patent: *Aug. 20, 2019

(54) SYSTEMS AND METHODS FOR PROVIDING CLOSED CAPTIONING IN THREE-DIMENSIONAL IMAGERY

(71) Applicant: ECHOSTAR TECHNOLOGIES L.L.C., Englewood, CO (US)

(72) Inventor: John Anthony Card, II, Denver, CO (US)

(73) Assignee: DISH TECHNOLOGIES L.L.C., Englewood, CO (US)

(*) Notice: Subject to any disclaimer, the term of this patent is extended or adjusted under 35 U.S.C. 154(b) by 372 days.

This patent is subject to a terminal disclaimer.

(21) Appl. No.: 15/056,631

(22) Filed: Feb. 29, 2016

(65) Prior Publication Data
US 2016/0182878 A1 Jun. 23, 2016

Related U.S. Application Data

(63) Continuation of application No. 13/610,635, filed on Sep. 11, 2012, now Pat. No. 9,300,894, which is a (Continued)

(51) Int. Cl.
H04N 5/445 (2011.01)
H04N 13/183 (2018.01)
(Continued)

(52) U.S. Cl.
CPC .......... *H04N 13/183* (2018.05); *H04N 5/445* (2013.01); *H04N 21/431* (2013.01);
(Continued)

(58) Field of Classification Search
CPC .... H04N 13/007; H04N 5/445; H04N 21/431; H04N 21/4348; H04N 21/4884; H04N 13/183; H04N 21/44012
See application file for complete search history.

(56) References Cited

U.S. PATENT DOCUMENTS 5,148,272 A 9/1992 Acampora et al.
5,400,401 A 3/1995 Wasilewski et al.
(Continued)

FOREIGN PATENT DOCUMENTS

CN 1703915 A 11/2005
JP 11289555 A 10/1999
(Continued)

OTHER PUBLICATIONS

JPO, Japanese Office Action issued in Japanese Patent Application No. 2011-548046, dated Jan. 22, 2013.
(Continued)

Primary Examiner — Tung T Vo
(74) Attorney, Agent, or Firm — Lorenz & Kopf LLP

(57) ABSTRACT

Systems and methods are presented for processing three-dimensional (3D or 3-D) or pseudo-3D media content. The programming includes closed caption (CC) information that includes caption data and a location identifier that specifies a location for the caption data within the 3D programming. The programming information is processed to render the caption data at the specified location within the media content and to present the programming on the display. By encoding location identification information into the three-dimensional media content, a high level of configurability can be provided and the 3D experience can be preserved while captions are displayed.

19 Claims, 5 Drawing Sheets

Related U.S. Application Data continuation of application No. 12/360,659, filed on Jan. 27, 2009, now Pat. No. 8,269,821.

(51) Int. Cl.
   *H04N 21/431* (2011.01)
   *H04N 21/434* (2011.01)
   *H04N 21/44* (2011.01)
   *H04N 21/488* (2011.01)

(52) U.S. Cl.
   CPC ... *H04N 21/4348* (2013.01); *H04N 21/44012* (2013.01); *H04N 21/4884* (2013.01)

(56) References Cited

U.S. PATENT DOCUMENTS

| | | | |
|---|---|---|---|
| 5,493,339 A | | 2/1996 | Birch et al. |
| 5,726,704 A | * | 3/1998 | Uomori ............... H04N 13/0014 348/47 |
| 5,745,184 A | | 4/1998 | Neal |
| 6,057,847 A | | 5/2000 | Jenkins |
| 6,163,337 A | * | 12/2000 | Azuma ................... G06T 15/10 348/43 |
| 6,449,309 B1 | * | 9/2002 | Tabata ............... G02B 27/2264 348/53 |
| 7,692,640 B2 | | 4/2010 | Van Geest et al. |
| 8,269,821 B2 | | 9/2012 | Card, II |
| 2002/0113752 A1 | * | 8/2002 | Sullivan ............ G02B 27/2278 345/6 |
| 2006/0126919 A1 | | 6/2006 | Kitaura et al. |
| 2007/0002045 A1 | * | 1/2007 | Finger .................. G06T 15/405 345/422 |
| 2007/0005757 A1 | * | 1/2007 | Finger ..................... G06F 9/542 709/224 |
| 2007/0081208 A1 | | 4/2007 | Chang et al. |
| 2007/0195082 A1 | | 8/2007 | Takanashi et al. |
| 2009/0066785 A1 | * | 3/2009 | Lee .................... H04N 13/0048 348/51 |
| 2009/0102975 A1 | | 4/2009 | Arai |
| 2009/0116818 A1 | * | 5/2009 | Sasaki ................. G11B 27/005 386/241 |
| 2009/0295816 A1 | * | 12/2009 | Kallio .................. G06T 15/005 345/553 |

FOREIGN PATENT DOCUMENTS

| | | |
|---|---|---|
| JP | H11289555 A | 10/1999 |
| JP | 2004274125 A | 9/2004 |
| JP | 2008245293 A | 10/2008 |
| WO | 2005031652 A1 | 4/2005 |
| WO | 2008115222 A1 | 9/2008 |
| WO | 20080115222 A1 | 9/2008 |

OTHER PUBLICATIONS

Advanced Television Systems Committee, "ATSC Digital Television Standard (A/53) Revision E, with Amendments No. 1 and 2," Dec. 27, 2005.
Bill Zou, TF Chair, "SMPTE Task Force on 3D to the Home," 2008.
3D @ Home Consortium, "An Overview of the 3D@Home Consortium," Oct. 22, 2008.
Wang-He Lou, Ph.D "Introduction of 3D Video Technology," Consumer Electronics Association Technology & Standards Forum: Are You Part of the Process?, Oct. 20-24, 2008.
Sarkis Abrahamian, "EIA-608 and EIA-708 Closed Captioning," 4 pages, undated.
Adam Kalai and Mel Siegel, "Improved Rendering of Parallax Panoramagrams for a Time-Multiplexed Autostereoscopic Display," 4 pages, undated.
Federal Communications Commission, Consumer & Governmental Affairs Bureau, "Part 79—Closed captioning of Video Programming," Oct. 27, 2005; retrieved from the Internet on Jan. 15, 2009 at http://www.fcc.gov/cgb/dro/captioning_regs.html.
European Patent Office, International Searching Authority, "International Search Report," dated Apr. 1, 2010; International Application No. PCT/US2010/021171 filed Jan. 15, 2010.
Intellectual Property Office "Office Action" dated May 7, 2013 for Taiwan Patent Appln. No. 098144246.
China State Intellectual Property Office, First Office Action, dated Jul. 1, 2013 for China Patent Application No. 201080004729.6.
Australian Government, Notice of Acceptance, dated Apr. 16, 2014 for Australian Application No. 2010208541.
Japan Patent Office, Notice of Rejection Ground for Japanese Patent Application No. 2011-548046 dated Jan. 22, 2013.
Wang-He Lou, Ph.D "Introduction of 3D Video Technology," Consumer Electronics Association Technology & Standards Forum: Are You Part of the Process?, Oct. 20-24, 2008, Mandalay Bay, Las Vegas, Nevada.
European Patent Office International Searching Authority, International Search Report for International Application No. PCT/US2010/021171 dated Apr. 1, 2010.
Intellectual Property Office, Office Action dated May 7, 2013 for Taiwan Patent Application No. 098144246.
State Intellectual Property Office of the People'S Republic of China, Office Action for Chinese Patent Application No. 201080004729.6 dated Jul. 1, 2013.
IP Australia, Notice of Acceptance for Australian Patent Application No. 2010208541 dated Apr. 29, 2014.
Office of the Controller-General of Patents, Designs and Trademarks, First Examination Report for India Application No. 5374/CHENP/2011 dated Dec. 29, 2017.
Hungarian Intellectual Property Office, Search Report in Application No. 201105375-8 dated May 30, 2013.

\* cited by examiner

SYSTEMS AND METHODS FOR PROVIDING CLOSED CAPTIONING IN THREE-DIMENSIONAL IMAGERY

CROSS-REFERENCES TO RELATED APPLICATIONS

This Application is a continuation of U.S. patent application Ser. No. 13/610,635, which is a continuation of U.S. application Ser. No. 12/360,659, filed Jan. 27, 2009, now U.S. Pat. No. 8,269,821.

TECHNICAL FIELD

The following discussion generally relates to the presentation of closed caption information in displayed three-dimensional (3D) imagery.

BACKGROUND

Closed captioning refers to any system that receives, formats, and displays text on a television or other display to thereby allow viewers to access additional or interpretive information about programming content. Closed captions generally display a transcription of the audio portion of a program as the program progresses, thereby allowing the hearing impaired and others to follow the program content without listening to the audio track associated with the programming.

Federal law mandates that all broadcast television programming in the United States must include closed caption information. For conventional analog NTSC programming, captions are "encoded" into line 21 of the vertical blanking interval (VBI) of the broadcast signal. For conventional digital (e.g., ATSC) programming, several streams are typically encoded in the digital multiplex, including a set of up to sixty-three caption streams encoded in ETA-708 format. Other closed captioning formats or standards may be implemented in the United States or elsewhere. Generally, the closed caption text is provided with the programming content, and the receiver generates text that overlies the received imagery in a "scrolling", "pop-on" or "paint-on" manner. Motion pictures, video disk (e.g., DVD) content, streamed audio/video, video games and the like may similarly incorporate closed captions using any number of standard or non-standard techniques.

It can be difficult, however, to apply conventional closed captioning techniques in a three-dimensional (or pseudo-three-dimensional) display for several reasons. First, as imagery is processed in more than two dimensions, it becomes increasingly difficult to identify a standard two-dimensional region of the display imagery that is appropriate for presenting closed caption information. Further, because three-dimensional displays are often highly configurable to suit viewer environments and preferences, it can be difficult to identify a standard location for closed caption data. Hence, conventional techniques used to present closed captioning in a two-dimensional viewing space may be unsuitable as three-dimensional displays and content programming become more prevalent.

It is therefore desirable to provide effective closed captioning in a three-dimensional type display. These and other desirable features and characteristics will become apparent from the subsequent detailed description and the appended claims, taken in conjunction with the accompanying drawings and this background section.

BRIEF SUMMARY

According to various exemplary embodiments, systems and methods are presented for processing three-dimensional (3D) or pseudo-3D programming. The programming includes closed caption (CC) information that includes caption data and a location identifier that specifies a location for the caption data within the 3D programming. The programming information is processed to render the caption data at the specified location and to present the programming on the display. By encoding location identification information into the three-dimensional programming, a high level of configurability can be provided and the 3D experience can be preserved while captions are displayed.

In other embodiments, a system for displaying three-dimensional programming is provided. The system suitably comprises a receiver interface and a processor. The receiver interface is configured to receive the three-dimensional programming, wherein the three-dimensional programming comprises closed caption information that includes caption data and a location identifier that specifies a location for the caption data within the three-dimensional programming. The processor is configured to render imagery corresponding to the three dimensional programming, wherein the imagery comprises the caption data rendered at the specified location within the three-dimensional programming.

Still other embodiments relate to a method of producing three-dimensional programming. The method suitably comprises determining appropriate locations for presenting caption data within the three-dimensional programming, identifying each of the appropriate locations with a location identifier, and encoding closed caption information into the three-dimensional programming, wherein the closed caption information includes the caption data and the location identifier that specifies the appropriate location for the caption data within the three-dimensional programming. This method may be practiced during production or post-production of the programming itself, or prior to transmission of the programming on any sort of terrestrial broadcast, satellite, cable or other transmission medium.

Various embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and FIG. 1 is a block diagram of an exemplary system for providing closed caption information in three-dimensional (or pseudo-three-dimensional) programming;

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, closed caption information is provided in a three-dimensional ("3D" or "3-D") programming stream in a manner that allows for presentation in a three-dimensional display. Information provided along with the closed caption text may include location information that specifies a suitable location for presenting the caption information in 3-D or pseudo-3D format. The location information may specify an anchor point or polygon in three-dimensional space, for example, that is suitable for displaying the closed caption text. The closed caption information can then be rendered and presented at the specified location on the display in a manner that accounts for user preferences (e.g., parallax settings, font size, color, transparency, and the like). Moreover, various embodiments allow for additional features, such as image occlusion of the closed caption data. When used, occlusion of the closed caption data can result in new effects that enhance the perception of three dimensions. These and other features are described more fully below.

The terms "three-dimensional", "3-D", "3D" and the like are intended to be used interchangeably and to refer to any type of presentation or display that processes, displays, and/or otherwise accounts for imagery in more than two dimensions. Such displays may include so-called "pseudo-3d" displays that present imagery in a two-dimensional manner, but that are capable of rendering the two-dimensional images based upon underlying three-dimensional polygons, objects or other data. Further, although the following discussion focuses primarily on broadcast sources of television, equivalent embodiments could apply the same features in any other context, including any sort of satellite, cable, terrestrial or other transmittable format, as well as any sort of stored media format (e.g., DVD, including conventional DVD formats as well as any sort of BLU-RAY or other high definition disk format), streaming video format (e.g., streaming video over the Internet or another network, as well as streaming over a telephone or other wireless network), cinema format and/or the like.

Figure 1:
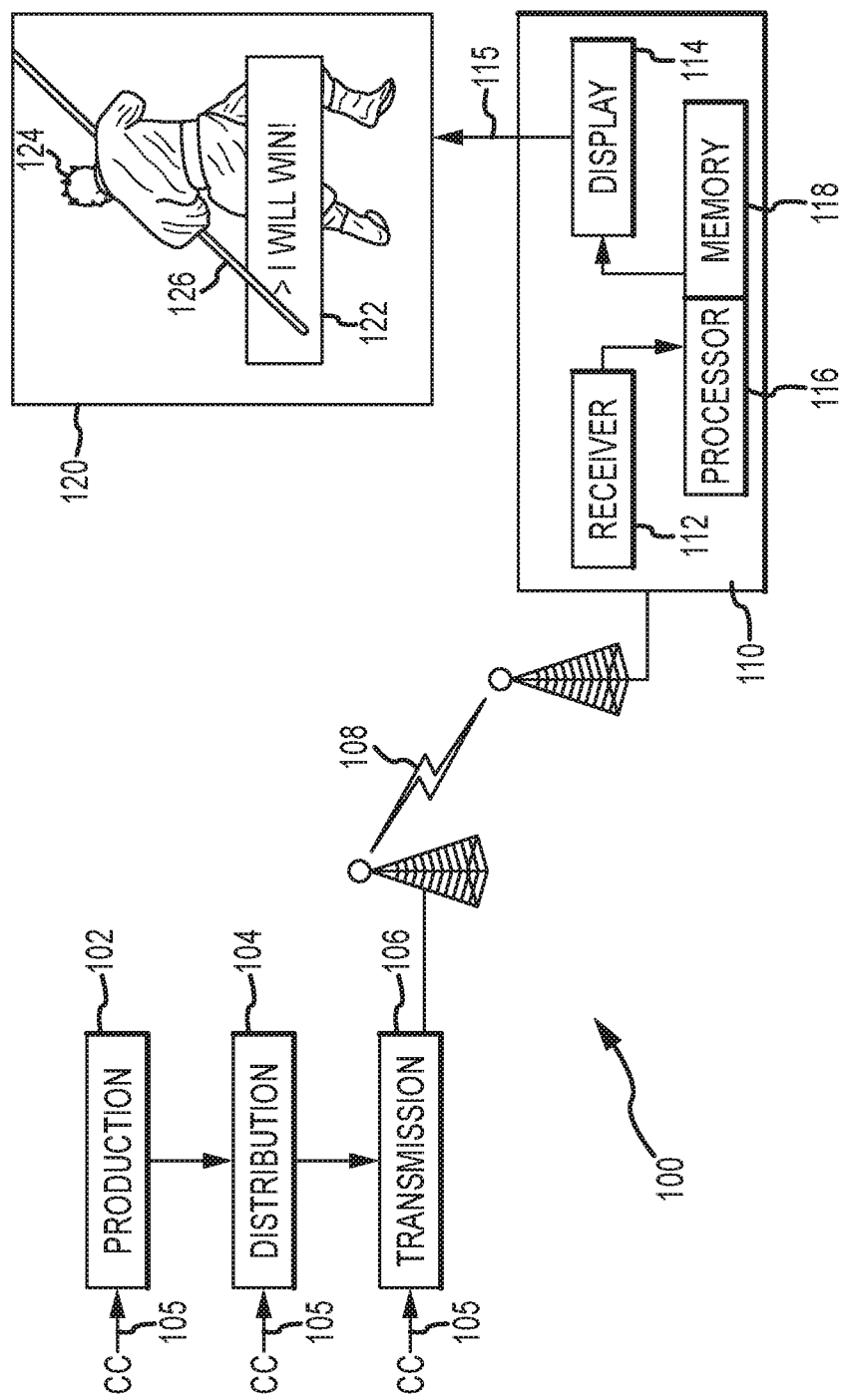

Turning now to the drawing figures and with initial reference to FIG. 1, an exemplary system 100 for producing three-dimensional imagery having closed caption information suitably includes a production system 102, a distribution system 104, and a transmission system 106 as appropriate. Content, once created, is provided to the viewer over any sort of broadcast or other distribution channel 108 for rendering at a media receiver 110 and playing on any sort display 120. As shown in FIG. 1, closed caption information 105 may be inserted into the programming at any stage of production 102, distribution 104 and/or transmission 106 to allow closed captioning to be presented in a manner that effectively presents the caption data to be presented in a manner that preserves the 3-D effect. In the imagery presented in display 120 of FIG. 1, for example, caption text is displayed within an object 122 that can be arranged on the display 120 so that other objects (e.g., actor object 124, sword object 126) are presented around the caption object 122 in a 3-D (or pseudo-3D) manner. FIG. 1, for example, shows a portion of sword object 126 occluding a portion of the caption object 122, thereby giving the illusion that the sword 126 is "in front of" the caption text. Caption object 122 may be further positioned, sized and/or otherwise displayed in response to user settings or preferences, including preferences for parallax (e.g., distance between two stereoscopic images used to create the 3-D effect), font, text size and/or the like.

Rather than simply presenting the caption text at a fixed location on the display 122, the location of the caption object 122 may be variably and configurably located anywhere in three dimensional space presented on display 120. The particular location of the caption object 122 may be defined in any manner. In various embodiments, the caption object 122 is located based upon location information that is inserted into the programming data during production 102, distribution 104 and/or transmission 106 of the program content. An author or producer, for example, may identify particular locations in two or three-dimensional space that could be appropriate for presenting caption data. These locations may be based upon then-current screen imagery, and may change as often as desired. Caption text may therefore be presented in different locations on display 120 as the programming progresses.

Caption location identifiers may be encoded and presented to the receiver 110 in any manner. In various embodiments, the closed caption information provided within the programming (e.g., within the broadcast or network stream, or within encoded data stored on any media) contains both caption text and location identifiers that specify a location of a caption object 122 that presents the caption text on display 120. The location of object 122 may be defined in any manner. In embodiments that provide a 3-D effect using two stereoscopic images, for example, the location of the caption may be defined with regard to an anchor point, polygon and/or other reference in either or both images. In embodiments that provide the 3-D effect using a depth map or the like, a box or other polygon can communicate a location for presenting caption text, and depth information may be provided for imagery that contains the caption box. The polygon may be defined, for example, as being parallel to the display surface, although other embodiments may define the polygon in any other manner. In some embodiments, separate depth information may be provided for rendering imagery when the caption box is not active.

Production system 102, distribution system 104 and transmission system 106 represent any system, device or organization capable of producing, distributing and/or transmitting program content, respectively. As noted above, closed caption information 105 may be inserted into the programming content in any manner at any stage of production, distribution and/or transmission. In various embodiments, caption information is encoded into the programming at the production stage, where an author, editor, producer or other party is capable of selecting one or more appropriate positions for the caption imagery 122 within the three-dimensional space presented by the program. Such information may be encoded into any sort of programming in any manner, such as during a conventional "post production" phase or the like. Insertion of caption information 105 during or just after production may be appropriate in any sort of programming, including cinema programming, television programming or any other programming that is delivered in any sort of standard format, such as any form of MPEG format that can be rendered by a player/receiver device 110. In other embodiments, however, caption information 105 may be added to programming during intermediate distribution (e.g., encoding or transcoding of programming that is stored onto DVDs or other portable media, or otherwise distributed to network affiliates, broadcasters and/or any other parties). In still other embodiments, caption information 105 may be inserted into the program stream just prior to broadcast or other transmission, much as current caption data is encoded in current two-dimensional broadcasts.

To that end, distribution channel 108 may represent any sort of data link, broadcast or other wireless connection, physical media, and/or other avenue for delivering programming content. Examples of distribution channels include, without limitation, broadcast television, very small aperture terminal (VSAT) satellite (e.g., for movie distribution), direct broadcast satellite (DBS), cable television, cellular or other wireless telephone networks, Internet or other data communications networks, and/or the like. Again, closed caption information 105 may be inserted into or otherwise encoded with programming content in any manner, and at any phase of production, post-production, distribution and/or delivery of the programming content.

Receiver no is any device, component, circuitry or logic capable of receiving and processing programming content. As shown in FIG. 1, receiver no includes a receiver interface 112, a processor 116 with associated memory 118, and a display interface 114 as appropriate. In various embodiments, receiver no is a conventional television receiver (e.g., a broadcast, satellite and/or cable television receiver) capable of receiving signals via distribution channel 108 and providing an output signal 115 that can be displayed to the viewer. In various embodiments, receiver no and display 120 make up a conventional television. In other embodiments, however, display 120 is any sort of television or other monitor that is capable of receiving a program signal 115 from a set-top box, decoder or other external receiver 110 as desired. Receiver 110 may be equivalently implemented as a DVD or other player that is capable of rendering content stored on any optical, magnetic and/or other portable media. In still other embodiments, receiver 110 is a media player capable of receiving media streams over a communications network (e.g., the Internet, a local or wide area network, and/or any sort of wireless telephony network). In such embodiments, receiver 110 may be a software program that executes on conventional computer hardware, such as a personal computer, personal digital assistant, mobile telephone, video game player and/or the like.

Receiver interface 112 is any hardware, firmware and/or software interface capable of receiving programming content. In various embodiments, receiver interface implements a demodulator/decoder feature for receiving and demodulating digital television programming over a broadcast, satellite, and/or cable programming link. In other embodiments, receiver interface 112 is a conventional network interface to a digital network such as the Internet, or any local area, telephone and/or other network having access to the Internet. As noted above, receiver interface 112 may equivalently receive programming from a DVD or other portable media, or any other source as desired.

Although not specifically shown in FIG. 1, many embodiments may also (or alternatively) provide a digital video recorder (DVR) or other recording feature that allows content to be stored for later viewing. Such content may be stored with caption information 105 to allow for decoding and viewing of content text at the time that the programming stored on the recorder is rendered.

Processor 116 is any sort of controller or the like that interacts with receiver interface 112 and display interface 114 to present imagery to the viewer on display 120. Processor 116 may be implemented using any sort of microprocessor, microcontroller, digital signal processor or other logic capable of directing the actions and processes of receiver no. Typically, processor 116 will be associated with any sort of memory 118, such as any sort of static, dynamic, flash or other memory capable of storing programming instructions and/or data for processing by processor 116. In various embodiments, receiver 110 is based upon a "system on chip" (SoC) implementation that incorporates a hybrid microcontroller 116 with memory 118, input/output and/or other features to perform the various signal processing and other actions of receiver no. Various SoC and other integrated hardware implementations are available from Texas Instruments, Conexant Systems, Broadcom Inc., and many other suppliers as appropriate. Other embodiments may implement processor 116 and/or memory 118 using any sort of application specific integrated circuit (ASIC) or the like. Still other embodiments may implement processor 116 and/or the other features of receiver 110 with any number of discrete and/or integrated processing components (e.g., any sort of microprocessor or microcontroller), memories 118, input/output features and/or other features as desired.

Display interface 114 is any physical and/or logical interface to display 120. As noted above, in some implementations receiver no and display 120 are provided in an integrated product (e.g., a conventional television). In other embodiments wherein receiver no provides video output signals 115 to an external display 104, such signals 115 may be provided in any compatible format. In embodiments wherein display 120 is a conventional television, for example, display interface 114 may provide video output signals 115 in any conventional format, such as component video, composite video, S-video, High-Definition Multimedia Interface (HDMI, e.g, any version of the CEA-861 standards), Digital Visual Interface (DVI), IEEE 1394, and/or any other formats as desired.

Display 120 is any sort of television, monitor and/or other display capable of presenting 3D or pseudo-3D imagery to a viewer. In various embodiments, display 120 operates in conjunction with receiver 110 to generate 3D imagery in any manner. Examples of 3-D display technologies include, without limitation, any sort of display based upon interlaced images (e.g., using horizontal, vertical, checkerboard and/or other interlacing), images provided in combination with any sort of depth map, stereo imagery, and/or the like. Such imagery may be viewed using any sort of anaglyphic techniques, or any sort of viewing techniques that make use of polarized filters, wavelength multiplexing, field sequential viewing, lenticular screens, parallax barriers and/or the like.

In practice, then, receiver 110 suitably receives 3-D type programming in any format or medium. The programming may be received at interface 112 from any broadcast or other transmission source, from any sort of streaming or portable media, and/or any other distribution channel 108. The 3-D programming is provided with caption information that includes caption text as well as location identifier information that identifies a location in three-dimensional space that is suitable for presenting the caption text. This information may be extracted from the programming stream in any manner, and may be further processed in conjunction with any user preference or other information to generate suitable imagery on display 120. In various embodiments, receiver 110 is able to process occlusion of the caption object 122 so that other objects within display 120 appear to be "in front of" the caption object, as appropriate. Moreover, the location of the caption object 122 may be rendered in a manner consistent with user parallax and/or other settings, as described more fully below. By providing location information for the closed caption text with the programming content itself, the viewing experience can be greatly enhanced.

Figure 2:
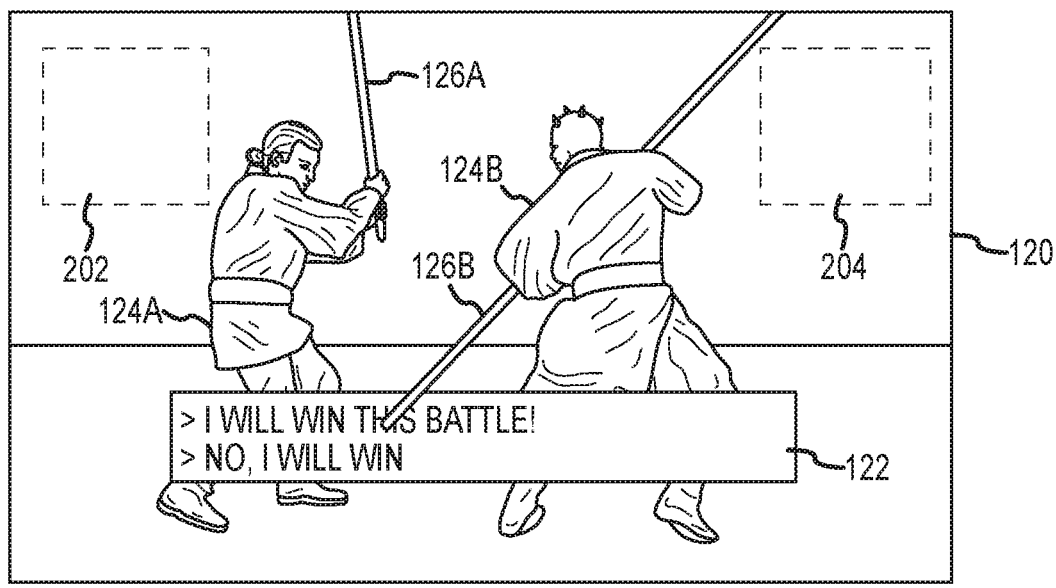
FIG. 2 is a diagram of an exemplary image that demonstrates occlusion of the caption box.

FIG. 2 is a diagram showing an exemplary display 120 that is presenting a program that includes various programming objects. In this example, two character objects 124A-B representing actors or actresses are engaged in a dual using swords 126A-B. As the characters engage in their duel, objects 124A-B and/or 126A-B may at times occlude caption object 122, thereby giving the impression to the viewer that the occluding object is in front of the caption object 122. This may be accomplished in any manner; in various embodiments, each of the objects 124A-B, 126A-B and 122 are described with respect to any sort of three-dimensional coordinate system. Objects are therefore rendered in their assigned three-dimensional space, with objects "in front" occluding objects behind. In the exemplary display 120 shown in FIG. 2, for example, sword object 126B is shown "in front of" caption object 122, with objects 124A-B and 126A shown "behind" caption object 122. Object 126B in this example therefore occludes a portion of object 122, and object 122 occludes portions of objects 124A-B and 126A, as shown. Similar concepts could be applied to any number or types of objects. That is, by defining a caption text object 122 with respect to other objects in the display 120, the object 122 can be placed at an appropriate location in three-dimensional space to allow effective viewing.

As noted above, the particular location for the caption object 122 may be configured in any manner, and may change throughout the duration of the program. Although FIG. 2 shows caption object 122 as being presented in a relatively "front and center" manner that overlies the primary objects in the display, captions could alternately be presented in other locations, such as locations 202 and/or 204. Caption data could be presented in a manner that spatially associates an actor object 124A-B with dialog spoken by the actor, for example. That is, dialog presented by actor object 124A could be presented area 202, while dialog from actor object 124B could be presented in area 204, as desired. Such dialog could be presented in a manner that simulates dialog boxes (e.g., comic-book type "balloons") or the like.

Although FIGS. 1 and 2 show caption object 122 as a box that occludes other objects located behind the object 122 in three-dimensional space, other embodiments may be shaped, sized and otherwise presented in any manner. Object 122 need not be a solid object that occludes objects behind it; to the contrary, object 122 may be relatively transparent to minimize occlusion. In such embodiments, the caption text may be presented as overlying some or all of the other imagery, with the remainder of object 122 being opaque or transparent to the viewer. Moreover, the object 122 itself may be dimensioned and shaped in any other manner. Although FIGS. 1 and 2 show object 122 as a rectangular box, object 122 may be equivalently presented as any regular or irregular shape (e.g., the dialog "balloons" referenced above) on display 120.

The particular locations for the caption object(s) 122 may be determined by any party using any technique. In various embodiments, an author, editor, producer or other party is able to define the locations during production of the program. This definition may be accomplished using editing software executing on a digital computer, or in any other manner.

In various embodiments, the location(s) for presenting caption text may be defined based upon an average parallax value or other parameter related to the displayed imagery. An average parallax setting, for example, could be calculated (e.g., using any sort of weighted or non-weighted averaging technique) during production, post-production or at any other point in time, with captions placed relative to the average parallax of the imagery as appropriate. Parallax averaging may be dynamically performed in the receiver as well, with caption data placed as appropriate.

Figure 3:
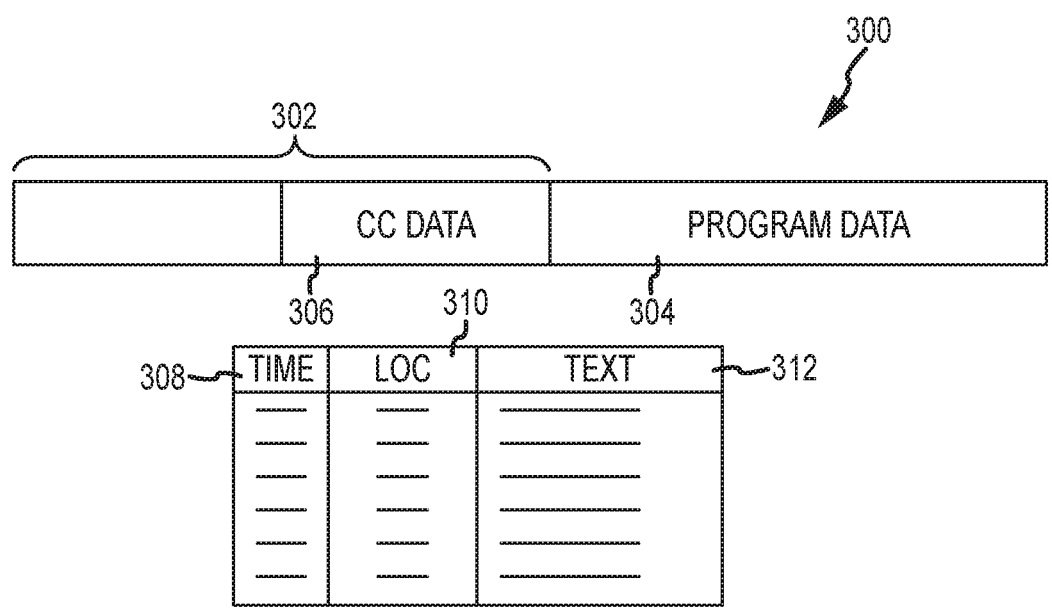
FIG. 3 is a diagram of an exemplary data structure suitable for carrying three-dimensional closed caption information.

After the locations are determined, the determined locations may be defined and/or described in any manner. In various embodiments, the location of the captions is defined by one or more location identifiers that are provided with the programming itself. With reference to FIG. 3, an exemplary data structure 300 for providing television or other programming suitably includes space 304 for program data, as well as any sort of data field 302 that includes closed caption information 306 as appropriate. Closed caption information 306 may include timing information 308, location information 310 and/or caption text 312 as appropriate. Data field 302 may be incorporated within an MPEG-defined or other header, for example, or any other data field or location as desired. In various embodiments, closed caption information 306 is provided as an ancillary or other programming stream within an MPEG multiplex or the like, although such information could be equivalently encoded into the same programming stream as the primary video imagery (e.g., with three dimensional information encoded in the program stream) or in any other related location or reasonable position. In embodiments wherein the caption information is provided in a separate stream from the programming itself, closed caption information may be associated with a program clock reference (PCR) or other time identifier 308 that allows for coordination of caption text 312 with dialog and/or other action within the program.

Location information 310 may be defined in any manner, depending upon the type of imagery presented within the program data 304. In a conventional stereoscopic image, for example, location information 310 may simply describe an anchor position in three-dimensional or pseudo-3D space. That is, information 310 may define a planar region or other two or three dimensional polygon suitable for presenting caption text 312. This polygon may be defined with respect to a single point, or any number of points. A single point, for example, could define a corner, center point or other reference, with the remainder of the polygon being defined by the content of caption text 312, and/or any number of default values. The size of a polygon may be defined to provide just enough space for presentation of the particular caption text 312, for example, with the size varying in response to the amount of text 312 presented at any given time. In other embodiments, multiple points could define opposing corners, center points, sides and/or other points of a regularly-shaped polygon in any manner. In still other embodiments, three points could define a planar or other region suitable for presenting caption text 312 on display 120. Each of the various points may be defined in any manner, for example with respect to pixels in display 120 and/or any other type of absolute and/or relative coordinates using any reference or point of origin as desired.

In other embodiments that make use of depth maps or other three-dimensional definitions instead of (or in addition to) stereoscopic imagery, caption location information 310 could define a polygon or other bounding object in any manner. Location information 310 could further include depth map information that describes imagery both when caption object 122 is active, and when captioning is inactive to allow for correct spatial rendering of the various objects in the programming stream 304 in either event. Again, location information 310 may define the location for presenting caption text 312 in any manner, using any sort of format or structure as appropriate for the particular embodiment.

Various additional features may be provided in any number of further embodiments. Two or more sets of caption data 306 could be provided, for example, to accommodate captions in multiple languages or other formats. Because each set of caption data 306 could have its own location information 310, captions could be displayed in different locations depending upon the set of data 306 selected by the viewer. This feature may be useful in accommodating language with different character sets, for example, or languages such as Japanese, Hebrew, Arabic or the like that are most conveniently viewed in a vertical manner, or in a different spatial manner than other languages. That is, a set of English captions could be presented at the bottom and center of display 120, whereas captions in vertical languages may be presented toward the left or right edges of display 120, as desired. This feature may be beneficial in two-dimensional displays that may not provide the other features described herein, as well as 3-D or pseudo-3D displays. Two-dimensional displays may therefore make some use of the spatial information 310 contained within the caption data 306 even though such displays may not necessarily render imagery in three dimensions.

Figure 4:
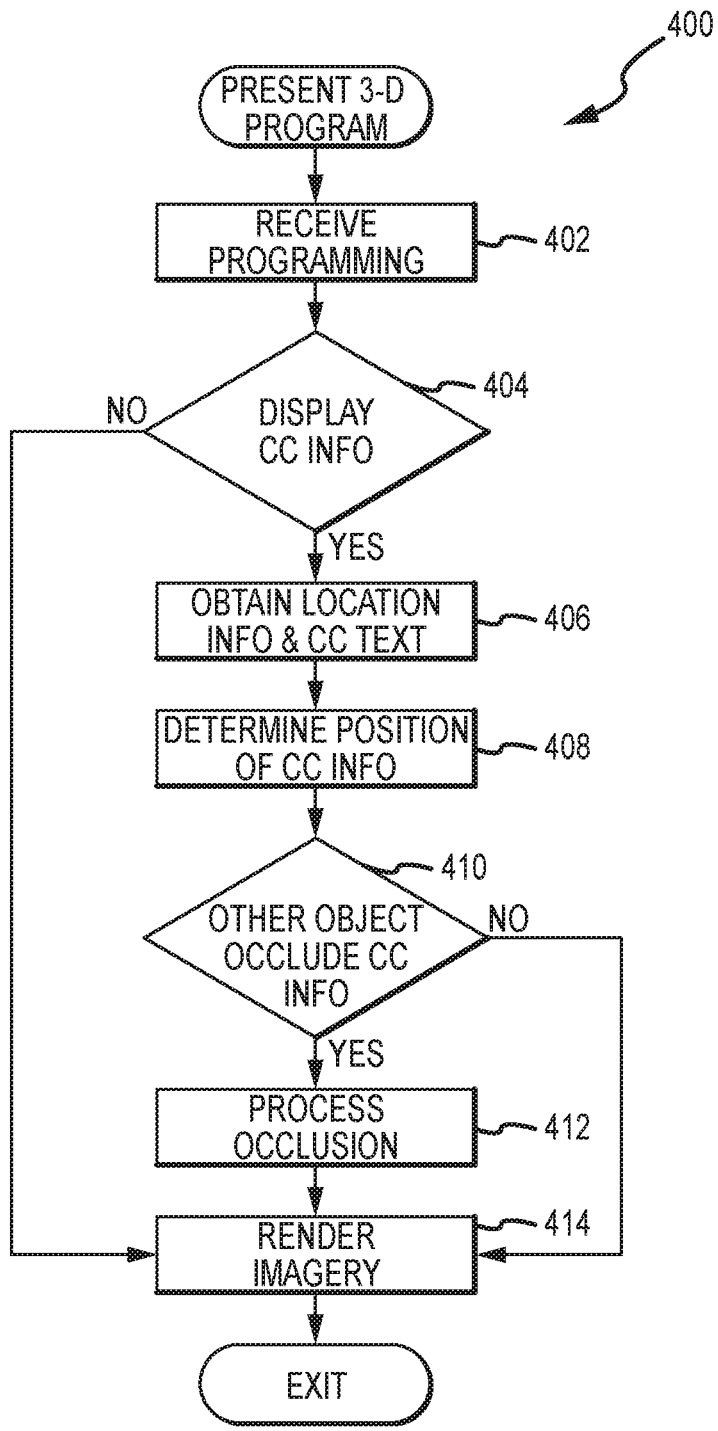
FIG. 4 is a flowchart of an exemplary process for presenting three-dimensional programming that includes closed caption information.

Turning now to FIG. 4, an exemplary method 400 for presenting 3D programming that includes closed caption information suitably includes the broad functions of receiving the programming (function 402), obtaining closed caption information that includes caption data and a location identifier that specifies a location for the caption data within the three-dimensional programming (function 406), and rendering the imagery on display 120 as appropriate (function 414). Other embodiments may additionally process occlusion of objects (functions 410, 412) and/or may determine the particular location of the caption information on display 120 (function 408) using user preference and/or other information as appropriate. Various other functions and other features may also be provided, as described in increasing detail below.

Generally speaking, the various functions and features of method 400 may be carried out with any sort of hardware, software and/or firmware logic that is stored and/or executed on any platform. Some or all of method 400 may be carried out, for example, by logic executing within receiver 110 in FIG. 1. In one embodiment, processor 116 executes software logic that performs each of the various functions shown in FIG. 4. Such logic may be stored in memory 118 or in any other storage available to processor 116 as desired. Hence, the particular logic and hardware that implements any of the various functions shown in FIG. 4 may vary from context to context, implementation to implementation, and embodiment to embodiment in accordance with the various features, scenarios and structures set forth herein. The particular means used to implement each of the various functions shown in FIG. 4, then, could be any sort of processing structures that are capable of executing conventional software logic in any format. Such processing hardware may include processor 116 or other components of receiver no in FIG. 1, as well as any other processors or other components associated with any conventional television, receiver, media player and/or the like.

Programming may be received in any manner (function 402). As noted above, various embodiments may process broadcast signals, including signals received from any sort of terrestrial, satellite and/or cable broadcast. Other embodiments may process programming stored on a portable media, or any sort of streaming or file-based media received from any source. Programming is received at receiver 110 as appropriate (e.g., at receiver interface 112) to allow subsequent processing and rendering of 3D imagery on display 120.

Various embodiments may process closed caption features in a modal or similar manner (function 404). That is, closed captions may be shown in one mode but not in another. Captioning may be activated or deactivated by the viewer in any conventional manner.

As noted above, the program information is suitably received with caption information 306 that includes both caption text 312 and caption location information 310 (function 406). When captions are active, receiver 110 suitably extracts and processes the caption information 306 to display the closed caption text in the desired manner. Such information may be extracted from a data structure 300 or other stream used to transport the program content 304, as described above. Such information may be extracted, decoded and/or otherwise processed using conventional MPEG or other decoding techniques, as appropriate.

The position of the closed caption information is determined in any suitable manner (function 408). In various embodiments, a caption object 122 is at least partially defined by location identifier information 310 contained within caption data 306. As noted above, captions may be provided in a planar or other region that may be defined in any manner. Alternatively, captions may be provided relative to a particular planar or other region within the imagery. In either case, the particular location of the region may or may not be parallel to the display surface. This position may be further modified in response to user preference information and/or other factors as appropriate. The basic position information contained within the caption information 306 may be adjusted in response to image occlusion, parallax settings, viewer location, equipment used, average depth of the 3D image, the dynamic content itself, other user preferences and/or the like, to name just a few examples. User information may be entered using any interface, for example, and may be stored in memory 118 or elsewhere.

As an example of the sort of modifications that could be performed, the position of a caption object 122 or the like could be adjusted in response to a parallax setting made by the user that affects the distance between two stereoscopic images provided on a 3D display 120. If the viewer is located relatively close to the display 120, for example, it may be desirable to use a lower parallax setting than if the viewer is located further away from the display to improve the 3D effect produced by the display. That is, closer viewers may have a better experience if the stereoscopic images are located more closely together than more distant viewers. As a result, many 3D displays may provide a configurable parallax setting that can be adjusted by the viewer. Various other types of "3D" settings could provide equivalent features. In systems that use 3D coordinates in place of conventional parallax settings, for example, objects positions are readily translated relative to the average parallax of the imagery, the average depth of the imagery, and/or any other "3D" parameters as appropriate. Any 3D-type adjustments or settings made by the viewer, then, can be considered to be equivalent to the parallax setting described herein in that such settings can be mathematically correlated to absolute or relative adjustments to object positions based upon the average parallax of the imagery.

Such settings can be further used to adjust the position of the caption object 122 used to present caption text. Various embodiments are able to determine an average parallax of the displayed imagery and to adjust the position of the caption text relative to the average parallax as desired. For example, if the object 122 is located away from the centerline of the display 120, the displacement from the centerline may be increased as the parallax setting is increased. Conversely, the position may be moved closer to the centerline of display 120 as parallax is decreased. In other embodiments, the apparent position of object 122 may be maintained in place, but the relative positions of stereoscopic images may be moved further apart based upon the parallax setting, thereby allowing for an improved viewer experience. The relative distance adjustment applied in response to the parallax setting may be defined according to any linear or non-linear function, as desired.

Other embodiments may similarly adjust the position and/or size of caption object 122 based upon other factors in addition to or in place of the parallax setting. If display 120 is an unusual shape or size, for example, adjustments could be made to the particular position specified in information 306 to allow for improved viewing on the particular equipment that is available. Other options that may be considered include the font type or size selected by the viewer, color settings and/or any other parameters that may be set by viewers or others as appropriate. The general information provided by the program author/producer, then, can be enhanced, modified or overridden by viewer preferences in various embodiments.

As noted above, occlusion effects may be used to further enhance the 3D viewing experience (functions 410, 412). In various embodiments, caption object 122 is defined in three-dimensional space in a manner that allows other options to be located "in front of" or "behind" the object 122 from the viewer's point of view. Objects in front of other objects can occlude, or block, some or all of the imagery located behind the occluding objects, as described above. In various embodiments, caption object 122 is simply defined in the same manner as any other three-dimensional object presented on display 120, with occlusion processed using conventional photogrammetry techniques. That is, using the various measurement data available of the various objects presented on display 120, a 3-D or similar image can be constructed on the display that presents closed caption information in an integral manner.

Processed imagery may be rendered in any manner (function 414). In various embodiments, imagery is provided from a set-top box, media player other receiver 110 to an external display 120 using any sort of interface 114 (e.g., an HDMI interface). In other embodiments, interface 114 simply represents any signal generation feature capable of driving an integrated display 120. In a conventional television or the like, for example, the functions of receiver 110 and display 120 may be integrated into a common device. Rendering of imagery for presentation on display 120 may therefore involve any sort of decoding, image processing, image rendering, decompression and/or other features commonly associated with conventional media processing.

Figure 5:
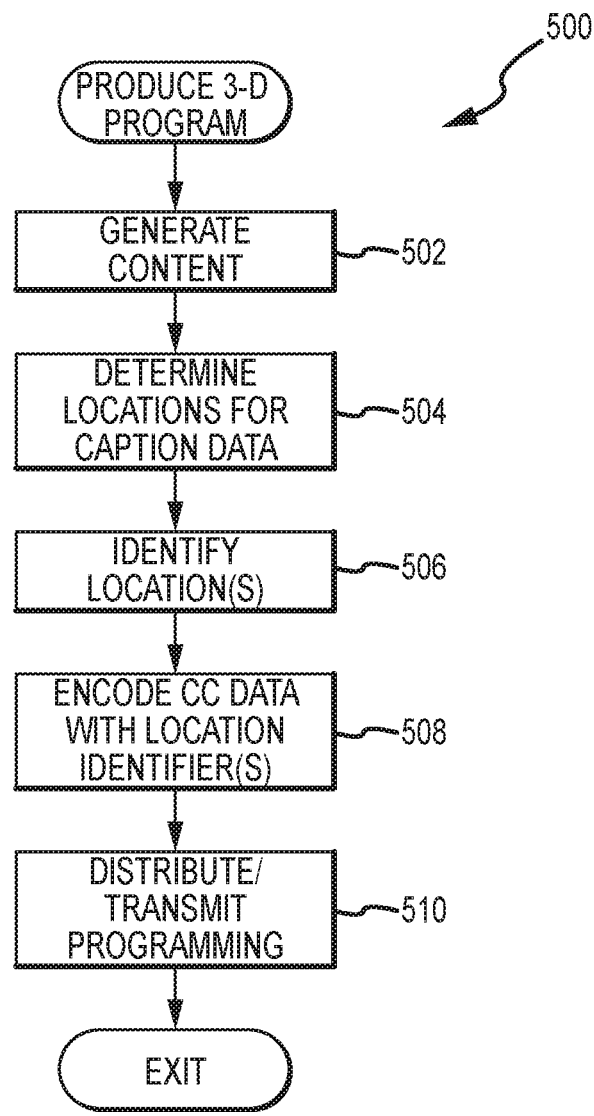
FIG. 5 is a flowchart of an exemplary process for producing three-dimensional programming that includes closed caption information.

FIG. 5 shows an exemplary process 500 for producing 3D programming that includes the broad steps of generating 3D content (function 502), determining locations for caption data (function 504), identifying and encoding the location information (functions 506, 508), and distributing the encoded programming as desired (function 510). Process 500 may be partially or entirely performed on any sort of digital computer executing any sort of software, as appropriate. As noted above, process 500 may be performed during production, distribution and/or transmission of the program content.

Generating content (function 502) suitably includes producing 3D-type content in any manner. Content may be produced from a live camera feed, for example, or from any conventional television, cinema or other media production techniques. Captured imagery may be produced in any manner to create an edited program product that, in turn, may be produced for distribution on any broadcast, cinema, streaming or stored media. The produced content may be represented in any digital or other format that can be stored on a digital media (e.g., memory or hard drive) and that can be partially or wholly loaded into an editing program for subsequent processing. The function 502 of generating content, then, may equivalently refer to loading produced content into a digital editing system or the like.

Locations for captions may be determined in any manner (function 504). In various embodiments, editing software displays the produced content and allows an editor or producer to select portions of the on-screen display that are suitable for content presentation. Such portions may be selected using any sort of selection or drawing tools, including any sort of mouse-driven or similar tools based upon graphical user input. In various embodiments, the locations of the captions may be assigned in response to average parallax and/or other factors as appropriate. As an example, the encoding system could determine the average parallax of the displayed imagery, and select locations for presenting caption data relative to the calculated average parallax.

As noted above, the particular caption locations may be identified in any manner (function 506). Location identifiers may relate to absolute or relative coordinates within the imagery, for example, or may simply define a spatial object with appropriate depth information or the like. Identifiers may be created in any format that is capable of being decoded by receiver no.

The program information is then encoded with the caption location identifiers as appropriate. As noted in conjunction with FIG. 3 above, caption location identifiers may be encoded into the programming stream in any manner. The encoded programming stream may be transmitted or otherwise distributed for subsequent viewing in any manner.

The general systems, structures and techniques described above may be inter-combined, enhanced, modified and/or otherwise implemented to provide any number of different features. In particular, the term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A system for displaying three-dimensional media content on a planar display, the system comprising:
   a receiver interface configured to receive the three-dimensional media content, wherein the received three-dimensional media content is received with closed caption information that includes caption data and location identifiers that define particular locations within imagery of the three-dimensional media content where the caption data is to be rendered, wherein the particular locations are planar regions within the three-dimensional media content where the caption data is to be presented; and a processor configured to direct the reception of the three-dimensional media content and to process the location identifiers received with the three-dimensional media content to thereby determine the particular locations of the imagery presented on the planar display that are specified by the location identifiers, and wherein the processor is further configured to generate the imagery corresponding to the three dimensional media content for presentation on the planar display so that the caption data is rendered at the particular locations that are specified by the location identifiers, and wherein the location identifiers place the caption data within the three-dimensional media content so that portions of the three-dimensional media content are presented in front of the caption data.

2. The system of claim 1 wherein the processor is further configured to process occlusion of the caption data within the three-dimensional media content so that the portions of the three-dimensional media content are presented in front of the caption data.

3. The system of claim 2 wherein the processor is configured to process the occlusion of caption data by determining the particular locations within the three-dimensional media content in response to the location identifiers and identifying occluding objects within the three-dimensional media content that are located in front of the caption data.

4. The system of claim 3 wherein the processor is further configured to render the imagery corresponding to the three-dimensional media content by presenting the occluding objects so that the occluding objects are presented in front of at least a portion of the caption data.

5. The system of claim 1 wherein the location identifiers are encoded within the three-dimensional media content itself when the three-dimensional media content is received by the receiver interface.

6. The system of claim 1 wherein the processor is further configured to determine an average parallax of the three-dimensional media content and to render the imagery comprising the caption data on the planar display relative to the average parallax.

7. The system of claim 6 wherein the processor is further configured to render the caption data on the planar display relative to a planar region defined relative to the average parallax.

8. The system of claim 1 further comprising a memory configured to store user configuration information comprising a parallax setting, wherein the processor is further configured to render the caption data within the three-dimensional space of the imagery on the planar display as a function of the parallax setting.

9. The system of claim 1 wherein the location identifier specifies a depth of the caption data within the three-dimensional space of the imagery that is less than the maximum depth of the three-dimensional media content.

10. The system of claim 1 wherein the planar regions are defined by one or more polygons within the three-dimensional space of the imagery where the caption data is to be presented on the planar display.

11. The system of claim 10 wherein the one or more polygons are substantially parallel to a surface of the planar display.

12. The system of claim 1 wherein the location identifier defines a first location in a first image and a second location in a second image so that the caption data is presented at a different location on the planar display in the first image than in the second image.

13. The system of claim 1 wherein the location identifier defines at least one coordinate in the three-dimensional space where the caption data is to be presented so that the caption data is presented within the three-dimensional space of the imagery.

14. A method executable by a media player to present three dimensional media content on a planar display, the method comprising:
receiving the three-dimensional media content by the media player, wherein the received three-dimensional media content comprises closed caption information that includes caption data and location identifiers that specify particular locations in three-dimensional space within the imagery of the three-dimensional media content where the caption data is to be rendered, wherein the location identifiers identify the particular locations in a three-dimensional space of the imagery presented on the planar display, wherein the particular locations are planar regions within the three-dimensional space and wherein the particular locations specified by the location identifiers vary from program to program;
processing the received location identifiers by the television receiver to thereby generate the imagery representing the three-dimensional space with the caption data inserted at the particular locations that are specified by the location identifiers received with the closed caption information; and
providing the imagery contained in the three-dimensional media content for presentation on the planar display so that the caption data is presented at the particular locations within the imagery of the three-dimensional media content that are specified within the location identifiers so that the caption data is presented within the three-dimensional imagery of the media content, and wherein the location identifiers place the caption data within the three-dimensional media content so that portions of the three-dimensional media content are presented in front of the caption data.

15. The method of claim 14 wherein the processing comprises processing an occlusion of the caption data within the three-dimensional media content so that the portion of the imagery is presented in front of the caption data.

16. The method of claim 15 wherein the processing of the occlusion of the caption data comprises determining the specified position of the caption data within the three-dimensional media content in response to the location identifier and identifying an occluding object within the three-dimensional media content that is located in front of the caption data.

17. The method of claim 16 wherein the processing comprises rendering imagery corresponding to the three-dimensional media content by presenting the occluding object on the display in a manner that occludes at least a portion of the caption data.

18. The method of claim 14 wherein the three dimensional imagery is presented as two stereoscopic images on the planar display.

19. The system of claim 1 wherein the three dimensional imagery is presented as two stereoscopic images on the planar display.

* * * * *